United States Patent
Kappert et al.

(10) Patent No.: US 12,436,034 B2
(45) Date of Patent: Oct. 7, 2025

(54) FERROELECTRIC SENSOR

(71) Applicant: TDK Electronics AG, Munich (DE)

(72) Inventors: Sandro Kappert, Graz (AT); Stefan Sax, Graz (AT); Johann Pichler, Breitenau am Hochlantsch (AT)

(73) Assignee: TDK Electronics AG, Munich (DE)

( * ) Notice: Subject to any disclaimer, the term of this patent is extended or adjusted under 35 U.S.C. 154(b) by 541 days.

(21) Appl. No.: 17/611,016

(22) PCT Filed: May 15, 2020

(86) PCT No.: PCT/EP2020/063664
§ 371 (c)(1),
(2) Date: Nov. 12, 2021

(87) PCT Pub. No.: WO2020/229674
PCT Pub. Date: Nov. 19, 2020

(65) Prior Publication Data
US 2022/0228921 A1    Jul. 21, 2022

(30) Foreign Application Priority Data
May 15, 2019   (DE) ..................... 10 2019 112 771.8

(51) Int. Cl.
| | | |
|---|---|---|
| *G01J 5/34* | (2022.01) | |
| *G01L 1/16* | (2006.01) | |
| *G01R 27/26* | (2006.01) | |
| *H10N 30/00* | (2023.01) | |
| *H10N 30/03* | (2023.01) | |
| *H10N 30/50* | (2023.01) | |
| *H10N 30/85* | (2023.01) | |
| *H10N 30/857* | (2023.01) | |
| *H10N 30/88* | (2023.01) | |
| *B25J 19/02* | (2006.01) | |

(52) U.S. Cl.
CPC .................... *G01J 5/34* (2013.01); *G01L 1/16* (2013.01); *G01R 27/2605* (2013.01); *H10N 30/03* (2023.02); *H10N 30/101* (2024.05); *H10N 30/50* (2023.02); *H10N 30/852* (2023.02); *H10N 30/857* (2023.02); *H10N 30/88* (2023.02); *B25J 19/028* (2013.01)

(58) Field of Classification Search
None
See application file for complete search history.

(56) References Cited

U.S. PATENT DOCUMENTS

| | | |
|---|---|---|
| 3,750,127 A | 7/1973 | Ayers et al. |
| 3,760,203 A | 9/1973 | Guntersdorfer |
| 4,954,811 A | 9/1990 | Chatigny et al. |
| 5,471,545 A | 11/1995 | Negami et al. |
| 5,702,629 A | 12/1997 | Cui et al. |

(Continued)

FOREIGN PATENT DOCUMENTS

| | | |
|---|---|---|
| CN | 101990717 A | 3/2011 |
| CN | 102983851 A | 3/2013 |

(Continued)

*Primary Examiner* — Erica S Lin
(74) *Attorney, Agent, or Firm* — Slater Matsil, LLP

(57) ABSTRACT

A sensor (1) which consists of a first electrode (3a), a ferroelectric layer (2) and a second electrode (3b) is described. The second electrode (3b) is connected to ground and the ferroelectric layer (2) is arranged between the first and second electrodes (3a, 3b).

33 Claims, 12 Drawing Sheets

(56) References Cited

U.S. PATENT DOCUMENTS

| | | |
|---|---|---|
| 5,831,371 A | 11/1998 | Bishop |
| 6,423,412 B1 | 7/2002 | Zhang et al. |
| 6,605,246 B2 | 8/2003 | Zhang et al. |
| 7,024,738 B2 | 4/2006 | Fujii et al. |
| 8,418,544 B2 | 4/2013 | Hortig et al. |
| 8,877,085 B2 | 11/2014 | Capsal et al. |
| 9,050,940 B2 | 6/2015 | Geiss |
| 9,337,803 B2 | 5/2016 | Takahashi et al. |
| 9,542,028 B2 | 1/2017 | Filiz et al. |
| 9,965,930 B1 | 5/2018 | Christensen et al. |
| 10,963,057 B2 | 3/2021 | Choi |
| 11,262,246 B2 | 3/2022 | Le Rhun et al. |
| 2002/0011589 A1 | 1/2002 | Lopatin et al. |
| 2004/0019810 A1* | 1/2004 | Casebolt ............ G06F 3/03543 |
| | | 713/300 |
| 2005/0109587 A1 | 5/2005 | Best et al. |
| 2005/0140249 A1 | 6/2005 | Kita et al. |
| 2005/0156486 A1 | 7/2005 | Orten |
| 2005/0219328 A1* | 10/2005 | Kodama ............ B41J 2/14209 |
| | | 347/70 |
| 2006/0043843 A1* | 3/2006 | Sugiura ................ G01S 7/521 |
| | | 310/348 |
| 2006/0196280 A1 | 9/2006 | Xi et al. |
| 2007/0089939 A1 | 4/2007 | Liebetrau |
| 2007/0106291 A1 | 5/2007 | Thao et al. |
| 2007/0185485 A1 | 8/2007 | Hauck et al. |
| 2007/0266799 A1 | 11/2007 | Sugiura |
| 2009/0007645 A1 | 1/2009 | Shih et al. |
| 2009/0309616 A1 | 12/2009 | Klinghult et al. |
| 2010/0181871 A1 | 7/2010 | Daniel et al. |
| 2013/0160109 A1 | 6/2013 | Klinghult |
| 2013/0200756 A1* | 8/2013 | Maki, Jr. ................ H10N 30/08 |
| | | 29/25.35 |
| 2013/0267946 A1 | 10/2013 | Brannan et al. |
| 2014/0354608 A1 | 12/2014 | Kitchens, II et al. |
| 2015/0068316 A1* | 3/2015 | Woerdenweber ..... H01L 29/516 |
| | | 427/430.1 |
| 2015/0120051 A1 | 4/2015 | Matsuzawa et al. |
| 2015/0165479 A1 | 6/2015 | Asiter et al. |
| 2016/0011063 A1 | 1/2016 | Zhang et al. |
| 2016/0072042 A1 | 3/2016 | Fukuda et al. |
| 2017/0139495 A1 | 5/2017 | Ozyilmaz et al. |
| 2017/0153105 A1 | 6/2017 | Chang et al. |
| 2017/0192560 A1 | 7/2017 | Ham et al. |
| 2017/0205374 A1 | 7/2017 | Koehler et al. |
| 2018/0108826 A1 | 4/2018 | Tajitsu et al. |
| 2018/0138886 A1 | 5/2018 | Yoon et al. |
| 2018/0308997 A1* | 10/2018 | Kotru ........................ G01J 5/10 |
| 2018/0364113 A1 | 12/2018 | Suzuki et al. |
| 2018/0370236 A1 | 12/2018 | Asaoka et al. |
| 2019/0032272 A1 | 1/2019 | Liff et al. |
| 2019/0099756 A1 | 4/2019 | Pang et al. |
| 2020/0122196 A1* | 4/2020 | Kobrin .................. B06B 1/0629 |
| 2020/0177103 A1 | 6/2020 | Lindsay et al. |

FOREIGN PATENT DOCUMENTS

| | | |
|---|---|---|
| CN | 103562014 A | 2/2014 |
| CN | 106662424 A | 5/2017 |
| DE | 2109063 A1 | 9/1972 |
| DE | 60000948 T2 | 7/2003 |
| DE | 102015200240 A1 | 7/2015 |
| DE | 112016006701 T5 | 12/2018 |
| EP | 1764845 A1 | 3/2007 |
| EP | 1791192 A1 | 5/2007 |
| EP | 1835552 A1 | 9/2007 |
| EP | 3633336 A1 | 4/2020 |
| GB | 2498433 | 7/2013 |
| JP | S61247930 A | 11/1986 |
| JP | S6382336 A | 4/1988 |
| JP | S63289460 A | 11/1988 |
| JP | H0295263 A | 4/1990 |
| JP | H04150079 A | 5/1992 |
| JP | H06139630 A | 5/1994 |
| JP | H0771952 A | 3/1995 |
| JP | H07175024 A | 7/1995 |
| JP | H088834 A | 1/1996 |
| JP | H08262039 A | 10/1996 |
| JP | H09113251 A | 5/1997 |
| JP | 2000065716 A | 3/2000 |
| JP | 2000507392 A | 6/2000 |
| JP | 2000230853 A | 8/2000 |
| JP | 2000230871 A | 8/2000 |
| JP | 2000346717 A | 12/2000 |
| JP | 2002513514 A | 5/2002 |
| JP | 2004304193 A | 10/2004 |
| JP | 2005041053 A | 2/2005 |
| JP | 2005060922 A | 3/2005 |
| JP | 2005114395 A | 4/2005 |
| JP | 2005522292 A | 7/2005 |
| JP | 2005347364 A | 12/2005 |
| JP | 2006144418 A | 6/2006 |
| JP | 2007119250 A | 5/2007 |
| JP | 2007285824 A | 11/2007 |
| JP | 2010506621 A | 3/2010 |
| JP | 2013513937 A | 4/2013 |
| JP | 2014238766 A | 12/2014 |
| JP | 2014240789 A | 12/2014 |
| JP | 2016076512 A | 5/2016 |
| JP | 2016090382 A | 5/2016 |
| JP | 2016516174 A | 6/2016 |
| JP | 2016520935 A | 7/2016 |
| JP | 2017146283 A | 8/2017 |
| JP | 2017198573 A | 11/2017 |
| JP | 2017215319 A | 12/2017 |
| JP | 2018173292 | 11/2018 |
| JP | 2018182009 A | 11/2018 |
| JP | 2019006027 A | 1/2019 |
| JP | 2019007749 A | 1/2019 |
| KR | 100758029 B1 | 9/2007 |
| KR | 101519043 B1 | 5/2015 |
| WO | 9530135 A1 | 11/1995 |
| WO | 0184642 A1 | 11/2001 |
| WO | 2016175321 A1 | 11/2016 |
| WO | 2018151440 A1 | 8/2018 |
| WO | 2019022114 A1 | 1/2019 |
| WO | 2020112160 A1 | 6/2020 |

\* cited by examiner

FERROELECTRIC SENSOR

This patent application is a national phase filing under section 371 of PCT/EP2020/063664, filed May 15, 2020, which claims the priority of German patent application 102019112771.8, filed May 15, 2019, each of which is incorporated herein by reference in its entirety.

TECHNICAL FIELD

The invention relates to a ferroelectric sensor.

BACKGROUND

Because of progressive digitization, which is currently being advanced under the terms Industry 4.0 or Internet of Things, interactions between machines and of machines with humans are becoming increasingly commonplace. One of the many challenges is to increase the safety of humans as well as machines during these interactions, by avoiding accidents.

In this context, in order to identify a hazard and avoid a possible coalition, various sensor types, which are often based on different physical effects, are installed in increasingly intelligent machines. On the one hand, optical sensors or camera modules may be used for early identification of a possible hazard by virtue of the extent of their detection range. Ultrasound sensors, on the other hand, are suitable for example for measurements at a close distance and may thus identify danger nearby. In immediate proximity, that is to say when contact takes place between a machine and the environment, a capacitive or resistive sensor, such as a contact protection strip, may for example be used to detect touching.

Usually, a plurality of different sensor types is installed in semiautonomous or fully autonomous machines in order to prevent a collision. Since the sensors cover different regions, a more complete image of the environment can thus be created.

Nevertheless, the installation of a plurality of sensors of different types in an application is expensive. Furthermore, the use of different sensor types entails high technical outlay. Different sensor types require their own drive and evaluation electronics, and so the overall sensor system becomes more complicated and larger. Furthermore, each further sensor type needs to be provided with at least its own constant and specific function test, which continually checks the sensor as well as the electronics, and which additionally increases the size of the overall system.

A sensor which functions on the basis of different physical effects and combines various sensor types is therefore desirable.

SUMMARY

Embodiments provide a sensor which generates a measurement signal on the basis of different physical effects.

A sensor which consists of a first electrode, a ferroelectric layer and a second electrode is described. The ferroelectric layer is arranged between the two electrodes and the second electrode is connected to ground.

A measurement signal may be tapped as a signal change between the electrodes. The ground can be at earth potential.

The ferroelectric layer may in this case consist of a material which exhibits ferroelectric properties in an electric field. The layer may preferably consist of a ferroelectric material with piezoelectric properties, particularly preferably a ferroelectric material with pyroelectric properties.

Since all pyroelectric materials are also piezoelectric materials, the functional layer between the electrodes is sensitive not only in relation to temperature changes but also because of the piezoelectric effect in relation to any deformation of the sensor. Since one of the electrodes is grounded, a close approach or touching of the electrode can change the capacitance between the electrode and the approaching object, and can likewise lead to a voltage change between the electrodes. In this way, three different physical effects may be used inside a sensor, a capacitive effect, a piezoelectric effect and a pyroelectric effect.

Combining the pyroelectric, piezoelectric and capacitive effects inside a sensor is particularly advantageous since the three effects are suitable for recording different events. With the pyroelectric effect, temperature changes which originate from the environment can be registered. Temperature changes which for example originate from the body heat of a human or the heat generation of a machine may therefore be contactlessly established from a distance. The capacitive effect may likewise be used for contactless detection, although a close approach to the sensor is required for this. It is, however, advantageous that the approach can be detected by means of the capacitive effect even when detection of the pyroelectric effect yields no sensor signal or only a small sensor signal because of the approach of an object which is at the same temperature. In a complementary way to the pyroelectric effect, the piezoelectric or capacitive effect may be used to record touching of the sensor by another object. In addition, the piezoelectric or capacitive effect can allow improved detection since, for the same sensor, a voltage signal weaker by a factor of 10 to 100 is generated by the pyroelectric effect than by the piezoelectric or capacitive effect. However, the piezoelectric effect differs from the capacitive effect in that an active spatial deformation of the piezoelectric layer must take place for a voltage change at the electrodes with the piezoelectric effect, while even a resting touch leads to a voltage change with the capacitive effect. Consequently, a voltage change is induced by the curvature of the piezoelectric layer by the piezoelectric effect for example in the case of a sensor projecting spatially outward, which is flexible and is bent by an approaching object. The voltage change is suitable for a measurement of the distance from the approaching object, since the level of the voltage change depends on the degree of curvature. If the deformed piezoelectric layer is at rest, however, or no deformation takes place, no voltage change occurs because of the piezoelectric effect. In this case, the capacitive effect, which leads to a voltage change between the electrodes even without deformation of the layer if the grounded electrode experiences a touch, comes into play.

By the sensor being able to employ different physical effects as a basis for the detection, the number of different sensor types which must be installed in an application can be reduced. Furthermore, the required drive and evaluation electronics may be simplified and streamlined since they do not need to be provided separately for each sensor type. If different physical effects which cover complementary detection ranges are furthermore used in the sensors, a more accurate overview of the environment may be obtained and an approach of an object may thus be established.

The measured changes of the electrical signal may comprise a change in the signal/time profile and/or the amplitude and/or the timescale and/or the temporal dynamics and/or the polarity. It may therefore be possible to record the entire dynamics of the electrical signal.

The electrical signal may comprise a voltage and/or a charge and/or a capacitance and/or a polarity. The electrical signal may therefore be independent of the type of measurement, or measurements may be carried out on the basis of different measurement principles.

The ferroelectric layer may comprise a polymer, a ceramic or a polymer-ceramic matrix, in which case polyvinylidene fluoride (PVDF) and copolymers thereof may be used as the polymer and lead zirconate titanate (PZT) or $BaTiO_3$ may be used as the ceramic. The aforementioned examples are in this case ferroelectric materials which have pyroelectric properties and satisfy industrial requirements. PVDF is a pyroelectric plastic which is pliable and therefore particularly suitable. Suitable methods for applying PVDF on the first electrode may be spin coating, screen printing or inkjet printing. PZT or $BaTiO_3$, on the other hand, is a pyroelectric ceramic which is flexible only as a thin layer. PZT ceramic may additionally be doped with Na, Ca or La in order to adapt the electrical properties. If the pyroelectric layer is PZT, $BaTiO_3$ or another lead-free or lead-containing ceramic, it may be applied on the first electrode by means of a thin-film method, for instance CVD, PVD, by means of a combination of sol-gel method with spin coating, or by means of screen printing.

Both the first and the second electrode may be made of a material which is transparent in the UV-Vis range and/or preferably in the IR range, and/or thermally conductive. This can ensure that infrared thermal radiation reaches the ferroelectric layer directly and therefore increases the sensitivity of the sensor. Suitable materials may for example be indium titan oxide (ITO), poly(3,4-ethylenedioxythiophene) polystyrene sulfonate (PEDOT:PSS), graphite, metal nanowires, carbon nanotubes or graphene.

Besides this, the electrodes may consist of one or more coats of metals such as Al, Cr, Ni, Ag, Cu, or a mixture, an intermetallic compound and an alloy of these elements or comprise these elements. They are preferably sputtered layers. In the case of sputtered layers, a plurality of coats of different metals, for example Cr/Ni/Ag, may also be sputtered above one another. By the selection of the respective metals, the contacting, for example by soldering, of the sensor may be improved since better adhesion can be made possible. Electrodes made of metal have a high electrical and thermal conductivity, and so the sensitivity of the sensor is not greatly impaired.

The sensor may furthermore comprise further first electrodes, second electrodes and ferroelectric layers, the ferroelectric layers being arranged between the first and second electrodes. By the sensor being implemented as a multilayer component, a plurality of functional ferroelectric layers may be ordered successively and both the sensitivity and the accuracy of the sensor may be increased.

Arrangement on or between elements may be either a direct arrangement, in which the arranged elements touch one another and lie directly on one another, or an indirect arrangement in which there may be further elements between the elements arranged on one another. The electrodes are in each case arranged directly onto a ferroelectric layer, so that they touch it and produce an electrical contact.

In a multilayer component, it is possible to contact the individual functional layers separately. In this case, the first electrodes are contacted by respectively separate first contact elements and the second electrodes are contacted respectively by separate second contact elements. In this way, a separate sensor signal may be evaluated for the respective functional layer, it additionally being possible to tap different types of sensor signals for the individual functional layers.

As an alternative thereto, in a multilayer component all the first electrodes may be electrically contacted by the same first electrical contact element and all the second electrodes may be electrically contacted by the same second electrical contact element. Therefore all the first electrodes are connected in parallel with one another and all the second electrodes are connected in parallel with one another. An electrical signal may be tapped between the contact elements. In this way, an amplified signal may be employed for the evaluation in the scope of a signal addition of the sensor signals from the signals of the individual functional layers.

Furthermore, the first electrode may be arranged inside the sensor, the ferroelectric layer may enclose the first electrode and the second electrode may enclose the ferroelectric layer. Such an embodiment may preferably be configured cylindrically or in the shape of a plate. The layers in the sensor may be arranged in such a way that the extent of the sensor in a direction which is perpendicular to the layers of the sensor is short in comparison with the extent of the sensor along the layers. This embodiment allows countless further applications for a sensor. Furthermore, a cylindrical geometry of the sensor is helpful for increasing the sensitivity in relation to deformations. An enclosed sensor may also be produced in an endless process, in a similar way to wire or cable manufacturing, so that economical production can be made possible.

According to one possible use of the term "encloses", a layer may be regarded as enclosed by another layer even if the enclosing layer envelops the underlying layer not perfectly but to a large extent. If sectional images are acquired transversely with respect to the layers, a layer may be considered to be enclosed if more than 90%, 95%, 99% or 99.9% of the sectional images do not have defects in the enclosing layer which extend through the entire layer thickness. During the production of the layers, unavoidable defects or cracks, which may make perfect envelopment difficult, may occur in the layers. Cracks which, however, only limitedly interfere with the function of the sensor may also occur in the layers of the sensor during operation because of mechanical loading. A layer or an element which is enclosed by a layer may alternatively be fully encapsulated by the latter.

The sensor may furthermore comprise an insulation layer on which the first electrode or the second electrode may be arranged, in which case the sensor may be coiled in such a way that the insulation layer lies on an inner side. In a coiled sensor, the inner side faces toward a center axis of the sensor and away from a lateral surface of the sensor. The coiling leads to electrodes which are spirally shaped in cross section through the sensor, and to a ferroelectric layer which is spirally shaped in cross section through the sensor and extends in a sandwiched fashion between the likewise spirally shaped electrodes. One of the electrodes, which is not arranged directly on the insulation layer, therefore forms a lateral surface of the coiled sensor.

A coiled sensor may preferably be configured cylindrically. By the sensor being coiled, it is also possible to produce cylindrical sensors with production processes for flat layers. The insulation layer is primarily used for electrical insulation of the electrodes, which would otherwise short-circuit when coiled. If the sensor is coiled repeatedly, a multilayer component is obtained, although the sensor has only one first and one second electrode. The electrical behavior differs significantly from an enclosed embodiment with a plurality of stacked layers since a single capacitance, which corresponds to a parallel interconnection of capacitors, is formed in the coiled sensor, while in an enclosed embodiment with a plurality of stacked layers, the capacitance which is formed between the electrodes corresponds to a series interconnection of capacitors. For comparable numbers of layers, materials and dimensions, a higher capacitance is therefore obtained for a coiled sensor and so the capacitive effect in the sensor is much more pronounced.

The sensor may furthermore comprise a carrier material. Depending on the application area, the carrier material may be nonresilient or resilient. A nonresilient carrier material may increase the mechanical stability of the sensor. Particularly for transport and installation of the component, a high mechanical stability may be useful for avoiding damage. For certain applications, arrangement on a carrier material consisting of glass, concrete or steel may also be necessary, even though the piezoelectric effect would thereby be reduced. Resilient materials which are envisioned as carrier material may inter alia be rubber, a plastic or a textile, for example polyester.

The first electrode or the second electrode may be arranged on the carrier material. It should be noted that sufficient adhesion between the electrode and the carrier material is necessary. Sufficient adhesion is ensured by a suitable selection of the materials for the carrier material and the electrode. A surface treatment of the carrier material, for instance roughening, may also be carried out in order to improve the adhesion between the carrier material and the electrode.

The sensor may furthermore comprise an insulation layer on which the first electrode or the second electrode is arranged, the sensor being coiled in such a way that the insulation layer is arranged on the carrier material. The mechanical stability of a coiled sensor may therefore be controlled by means of the selection of the carrier material. Since different materials and even objects are envisioned as carrier material, such an arrangement opens up a multiplicity of possible application fields for the sensor. By the sensor being coiled, the capacitive effect of the sensor is enhanced.

In a further embodiment, a carrier material may be arranged inside the sensor, the first electrode enclosing the carrier material, the ferroelectric layer enclosing the first electrode and the second electrode enclosing the ferroelectric layer. The sensor may be made stiffer or more flexible and optimized by the selection of the carrier material, depending on the application. This embodiment may also preferably be configured cylindrically or in the shape of a plate. It is furthermore also possible to produce a sensor configured in this way in an endless process and therefore economically.

A sensor with a first electrode on the inside may comprise further first, second electrodes and ferroelectric layers, the first and second electrodes being arranged radially alternating and a ferroelectric layer respectively being arranged between one of the first electrodes and one of the second electrodes. Since a plurality of functional ferroelectric layers are thus ordered successively, both the sensitivity and the accuracy of the sensor may be increased.

An enclosed sensor as well as a coiled sensor, quite independently of whether it comprises a carrier material, may comprise further first electrodes, second electrodes and ferroelectric layers, a ferroelectric layer respectively being arranged between one of the first electrodes and one of the second electrodes. In a similar way to a stacked multiple-layer component, the signal strength and therefore the sensitivity as well as the accuracy of the sensor are therefore increased.

The carrier material for an enclosed or coiled sensor may, for example, be a textile fiber. This sensor may for example be woven into clothing, coverings or carpets. Synthetic textile fibers, for instance made of polyester, are highly suitable for this use. Natural fibers may, however, also be used if they withstand the production process.

The carrier material may furthermore also be a glass fiber. This may be used externally to communicate a system state, for example whether direct touching of the sensor is taking place or there is an approach of a heat source, by a color output or color change.

An optically reactive sensor layer may be applied on a part of a lateral surface of the glass fiber. This reactive layer may for example react to the pH or $O_2$ content in the environment by a color change. With the aid of the glass fiber, this color change may be measured and the sensor may be expanded by a further sensory dimension. The use of fiber Bragg gratings as carrier material is also possible, and may increase the information output of the sensor.

It may be advantageous to configure the sensor cylindrically. The sensor is therefore radially symmetrical and a measurement signal, which for example results from a deformation of the sensor, is direction-independent. A configuration of the sensor in the shape of a plate is also possible. With a plate shape, a width and a length may be at least ten times as great as a height. This makes production processes for flat sensors possible for the production of the sensor.

The sensor may furthermore comprise at least one mechanical amplifier element. The mechanical amplifier elements may for example be hair- or bristle-shaped projections which transmit a mechanical touch onto the sensor. In this way, the action range which induces a piezoelectric effect because of deformation and the capacitive effect may be increased. The mechanical amplifier elements may consist of a composite material or of plastics such as PET, thermoset or PTFE.

The mechanical amplifier element may be formed from the first and/or second electrode. The production of the mechanical amplifier element may be incorporated into the production process of the electrodes, so that the sensor may be expanded favorably and in an uncomplicated fashion by mechanical amplifier elements.

If the sensor comprises a carrier material, the at least one mechanical amplifier element may also be formed from the carrier material. Particularly in cylindrical sensors, whether enclosed or coiled, a carrier material arranged on the inside may protrude from the sensor and thus straightforwardly form a mechanical amplifier element.

As an alternative, the at least one mechanical amplifier element may be formed from the first electrode and the carrier material. This embodiment is also particularly suitable for cylindrical sensors. In this case, the carrier material and an electrode arranged on the carrier material protrude from the sensor. Not only the action range of the piezoelectric effect but also the action range of the capacitive effect of the sensor are therefore increased.

The individual layers of the sensor, i.e. the ferroelectric layers and the first and second electrodes, may respectively be thinner than 50 μm. By the sensor being made extremely thin, it can be flexible and pliable, which is advantageous in particular for measurements based on the piezoelectric effect. A thin configuration, especially of the pyroelectric layer, allows a low thermal mass of the sensor and therefore improves the response time and the sensitivity of the sensor in relation to temperature changes.

One advantageous arrangement may comprise the sensor described above and evaluation electronics. The evaluation electronics may be configured to measure a voltage generated in the ferroelectric layer and to identify changes of the voltage by a piezoelectric effect, a pyroelectric effect and a capacitive effect. The evaluation electronics should be configured to allocate the measurement signal to one or more of the physical effects from the signal/time profile with the aid of the amplitude, the timescale, the temporal dynamics and the polarity. With the aid of the allocation of the voltage change to one or more of the physical effects, the evaluation electronics can identify whether an object is approaching the sensor or whether an object is touching the sensor.

In a further advantageous arrangement, a plurality of sensors may be arranged in a matrix. By the arrangement of the sensors in a matrix, position-resolved measurements may be carried out and movements may therefore also be tracked. For example, planar sensors may be arranged on a substrate or cylindrical sensors may be arranged in such a way that they emerge in a carpet fashion from a substrate.

The sensor may be integrated in a robot. Robots, especially autonomous robots such as cleaning robots, lawnmower robots, delivery robots or transport robots, benefit from a simplified sensor which can establish an approach to the robot. If an approach is registered by the sensor, the robot may act accordingly by reducing its speed, remaining stationary or avoiding an obstacle.

Collaborative systems which comprise sensors likewise benefit from the possibility of registering an approach. In collaborative systems, there are numerous interactions of machines with humans and with other machines, which constitute a risk of collisions. Reliable detection of the environment by the sensor minimizes the accident risk and offers a safe work process.

The sensor may also be integrated into automatic doors, especially automatic revolving doors or elevator doors. If the sensor identifies an approach of a person, it may open the door, prevent closing of the door or reduce the rotational speed of a revolving door, in order to prevent a collision or trapping the approaching person.

Further embodiments provide a method for producing the sensor described above, wherein the ferroelectric layer is applied on the first electrode by means of a thin-film method, for example CVD or PVD, or by means of a combination of a sol-gel method with spin coating.

BRIEF DESCRIPTION OF THE DRAWINGS

The invention will be explained in more detail below with the aid of schematic representations.

Elements which are the same, similar or apparently the same are provided with the same references in the figures. The figures and the size proportions in the figures are not true to scale.

DETAILED DESCRIPTION OF ILLUSTRATIVE EMBODIMENTS

Figure 1:
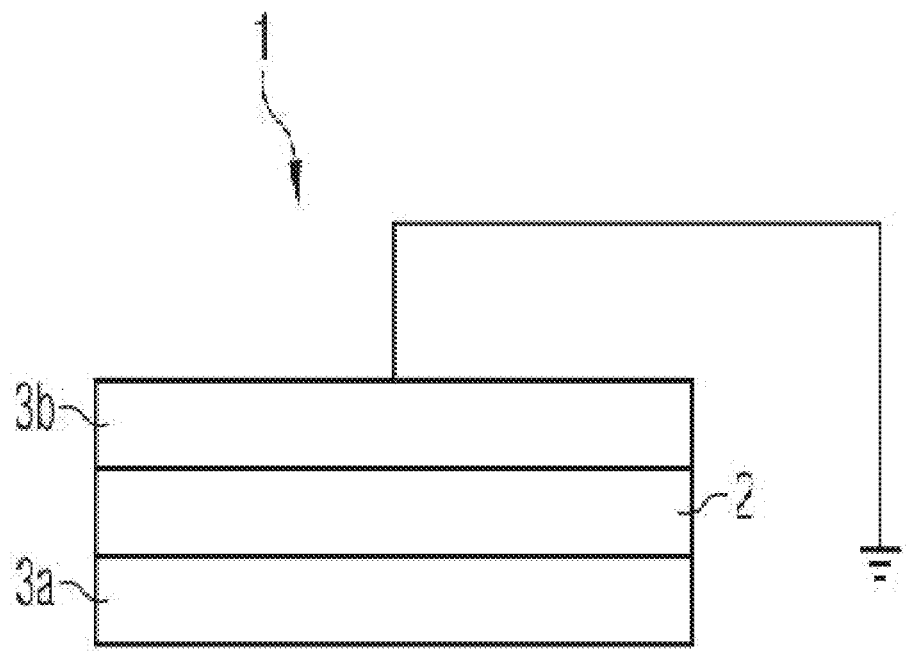
FIG. 1 shows a schematic cross-sectional view of a first exemplary embodiment of the present invention.

FIG. 1 shows a schematic cross-sectional view of a sensor 1. Arranged over a first electrode 3a, there is a ferroelectric layer 2, and a second electrode 3b is arranged over the latter. The second electrode 3b is electrically contacted and connected to ground.

The ferroelectric layer may in this case consist of a material which exhibits ferroelectric properties in an electric field. The layer may preferably consist of a ferroelectric material with piezoelectric properties, particularly preferably a ferroelectric material with pyroelectric properties.

The electrodes 3a, 3b are electrically contacted (not shown), and a voltage change may for example be read out between the electrodes 3a, 3b as a measurement signal. The pyroelectric layer 2, which is also piezoelectric, reacts both in relation to temperature changes and in relation to deformation by a charge separation, which leads to a voltage change at the electrodes 3a, 3b. Owing to the grounding of the second electrode 3b, the capacitance change between the second electrode 3b and an approaching object, in the event of close approach or touching, results in a voltage change between the electrodes 3a, 3b. The sensor 1 uses three different physical effects, the capacitive effect, the piezoelectric effect and the pyroelectric effect, in order to cover different detection ranges.

By virtue of the pyroelectric effect, it is possible to detect temperature changes which, depending on the heat source, may be a few meters away. The capacitive effect may likewise be used for contactless detection, but a close approach of an object to be detected within a few centimeters to the sensor 1 is required for this. The piezoelectric and capacitive effects may be used to establish touching of the sensor 1 by another object. The piezoelectric effect, however, differs from the capacitive effect in that an active spatial deformation of the pyroelectric layer 2 must take place for a voltage change at the electrodes 3a, 3b with the piezoelectric effect, while even a resting touch leads to a voltage change with the capacitive effect.

The ferroelectric layer 2 comprises PVDF or PZT. Both materials are pyroelectric. PVDF is particularly suitable as a pyroelectric plastic which is resilient, since the ferroelectric layer 2 can easily be deformed and a voltage change can therefore be induced by the piezoelectric effect. A ferroelectric layer 2 made of PVDF may for instance be applied by spin coating, screen printing or inkjet printing. PZT, on the other hand, is a pyroelectric ceramic which exhibits flexibility as a very thin layer. It is possible to dope the PZT ceramic with Na, Ca or La in order to adapt the electrical properties. PZT or other pyroelectric ceramics may be applied with the aid of a thin-film method, for example CSD or PVD. PVDF has the advantage over ceramics such as PZT that it can be applied without problems on a large area, since ceramics in the form of a large-area layer may crack because of internal stress and pressure.

Preferably, the first and second electrodes 3a, 3b consist of a transparent conductive material, for example ITO, PEDOT:PSS, silver, graphite, metallic nanowires, carbon nanotubes or graphene. Materials which have transparency in the UV-Vis range and/or in the IR range and/or with a good thermal conductivity are particularly highly suitable as electrodes 3a, 3b. This facilitates the heat input into the ferroelectric layer 2 since infrared thermal radiation impinges directly on the ferroelectric layer 2. The sensitivity of the sensor 1 is therefore increased, especially with respect to the pyroelectric effect. The electrodes 3a, 3b may consist of metals such as Al, Cr, Ni, Ag, Cu, a mixture of metals, an intermetallic compound or an alloy. Since metals have a high electrical and thermal conductivity, they are likewise suitable as electrode material.

The layers of the sensor 1 are respectively thinner than 50 μm, so that the overall sensor 1 is flexible and pliable. The sensor 1 can therefore be easily deformed, which leads to a voltage change between the first and second electrodes 3a, 3b because of the piezoelectric effect. Since the sensor 1 is extremely thin, it has a low thermal mass and so the response time is shortened and the sensitivity of the sensor 1 in relation to temperature changes is increased.

The sensor 1 need not be configured with only one pyroelectric layer 2, as shown in FIG. 1, but may be produced with a plurality of pyroelectric layers 2 and a plurality of first and second electrodes 3a, 3b in a multilayer structure. In this case, the pyroelectric layers 2 are always arranged between first and second electrodes 3a, 3b, the first and second electrodes 3a, 3b alternating with one another in the stack direction. Both the sensitivity and the accuracy of the sensor 1 may be increased by implementing the sensor 1 as a multilayer component.

Figure 2:
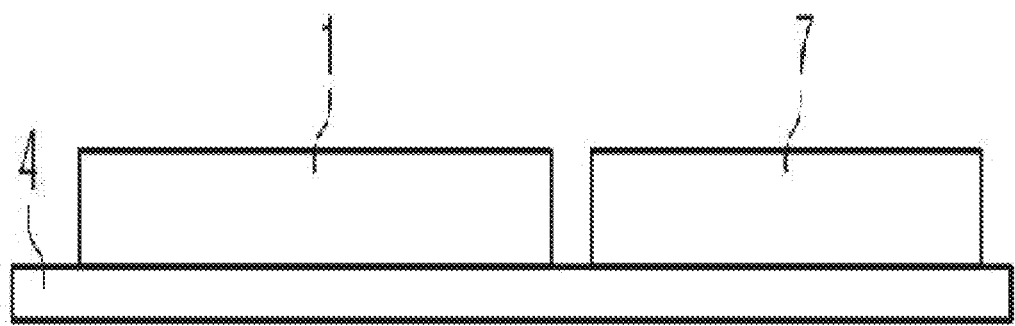
FIG. 2 shows a schematic arrangement with a sensor and the evaluation electronics.
Figure 3:
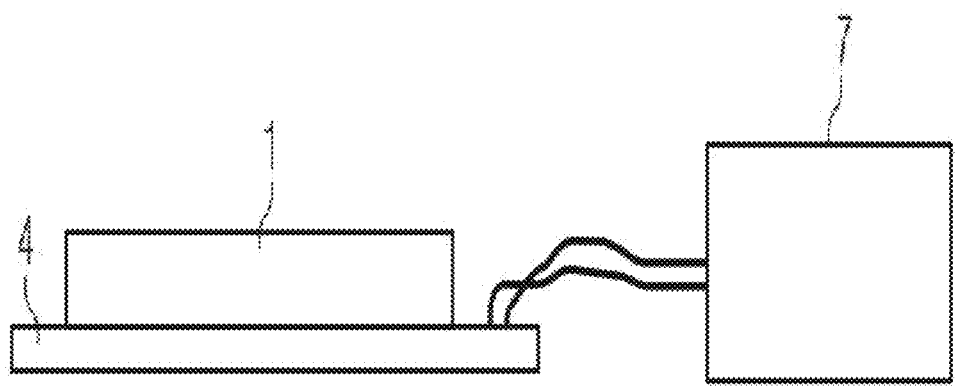
FIG. 3 shows a further schematic arrangement with a sensor and the evaluation electronics.
Figure 4:
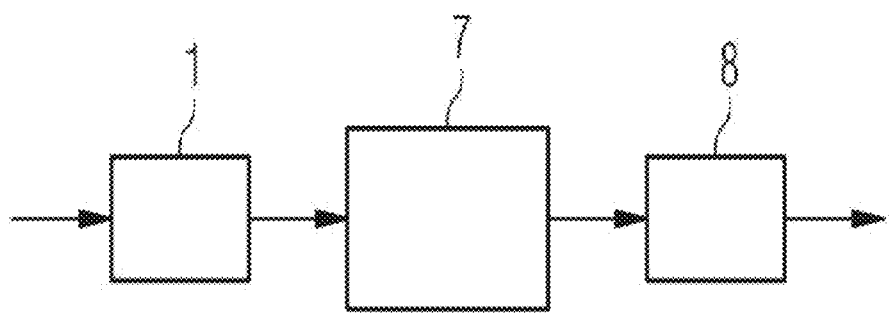
FIG. 4 shows a structural diagram of the evaluation.

The measurement signal, which is tapped as a voltage change at the first and second electrodes 3a, 3b, is forwarded to evaluation electronics. The evaluation electronics 7 may in this case be arranged on the same carrier material 4 as the sensor 1, as represented in FIG. 2, or not on the same carrier material 4, as represented in FIG. 3. The evaluation electronics 7 are contacted either directly on the sensor 1 or via the carrier material 4, as shown in FIG. 3. If a voltage change occurs at the sensor 1 because of a measurement event, this voltage change is forwarded in analog fashion to the evaluation electronics 7, as may be seen in FIG. 4. The evaluation electronics 7 inter alia have signal amplifiers, comparators and microprocessors and are configured to allocate a measurement curve to the piezoelectric, pyroelectric or capacitive effect. Subsequently, the signal is sent digitally to digital evaluation 8, which in turn delivers an output signal.

Figure 5:
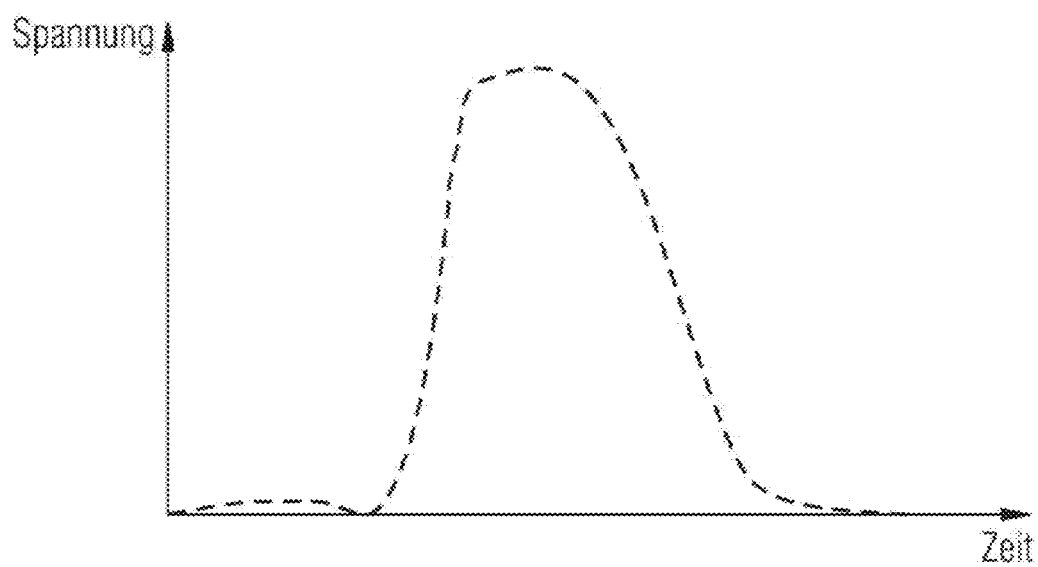
FIG. 5 shows a schematic measurement curve of a sensor.
Figure 6:
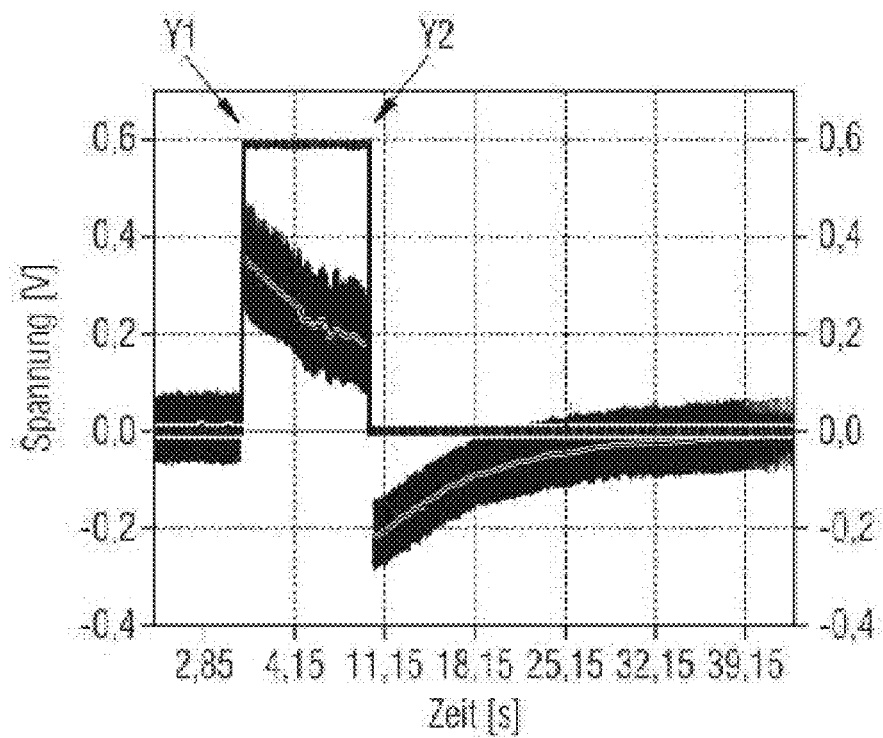
FIG. 6 shows a measurement curve of the voltage change because of a pyroelectric effect.
Figure 7:
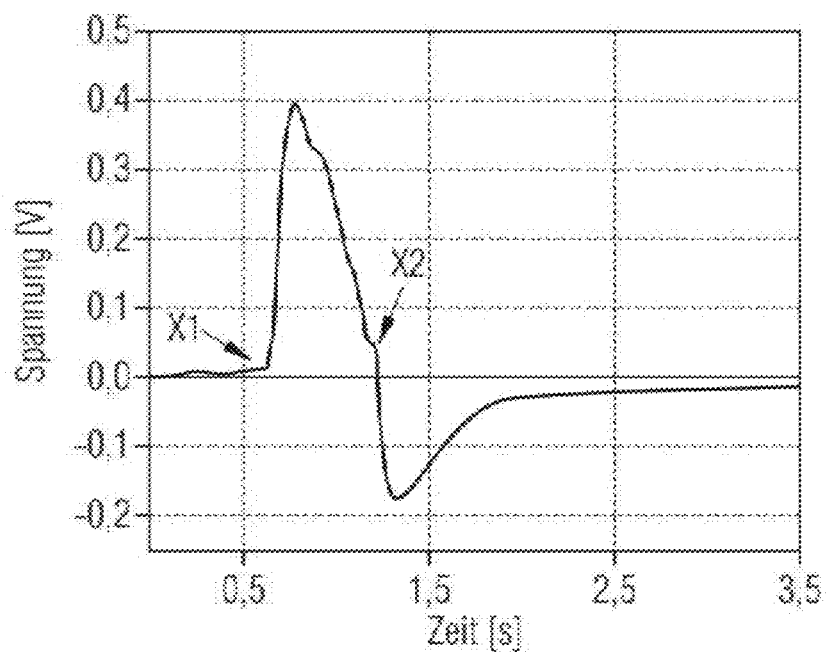
FIG. 7 shows a measurement curve of the voltage change because of a piezoelectric effect.

FIG. 5 shows an exemplary curve which depicts a voltage change after a mechanical or thermal stimulation of the sensor 1. In the diagram in FIG. 5, as in the diagrams in FIGS. 6, 7 and 8, the voltage is plotted against time. FIG. 6 shows a voltage change which is due to a purely pyroelectric effect. At the point Y1, a heat source is turned on, and at the point Y2 it is turned off. FIG. 7 represents a measurement curve which originates only from the piezoelectric effect. At the point X1, a deformation is induced by a pressure application, and at the point X2 the pressure application is released. The measurement curve in FIG. 8 shows a voltage change at the sensor 1, which originates exclusively from a capacitive effect.

Figure 8:
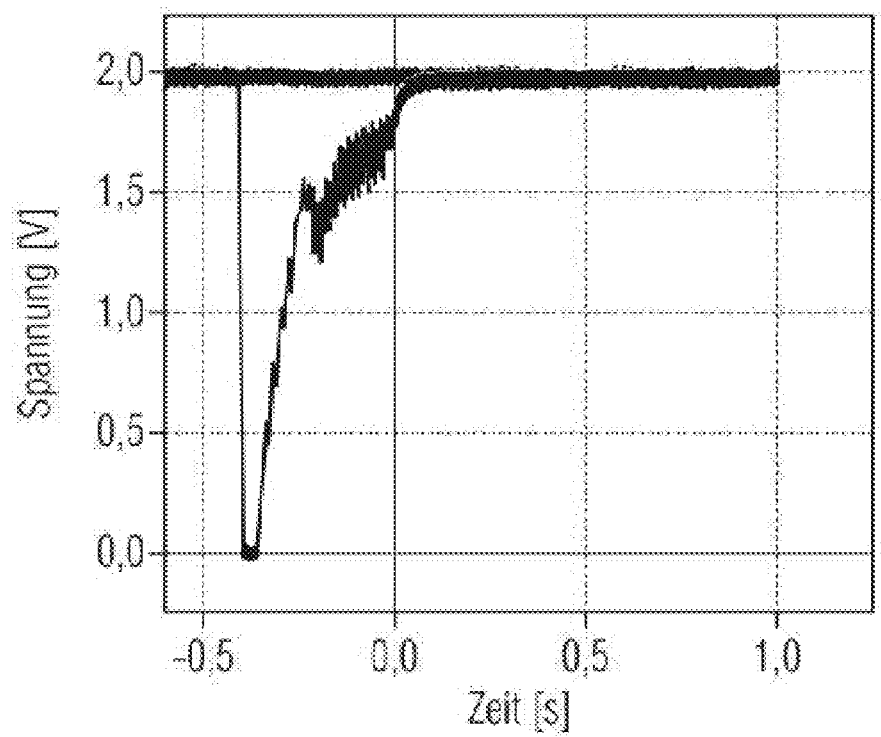
FIG. 8 shows a measurement curve of the voltage change because of a capacitive effect.

An excursion of the measurement curve because of the pyroelectric effect is, for example, slower than an excursion because of the piezoelectric or capacitive effect, as revealed by a comparison of FIG. 6 with FIGS. 7 and 8. Furthermore, the curve profile for the pyroelectric effect, as may be seen in FIG. 6, may have irregularities when a heat source acts on the sensor 1 (Y1) or is subsequently turned off or shielded (Y2). In this case, turning off the heat source acts as a negative temperature difference, so that the polarity is changed and the measurement curve experiences an abrupt sign change.

In the case of the piezoelectric effect, a sign change as shown in FIG. 7 may likewise take place in the measurement curve, for example when releasing (X2) the sensor 1 after it has previously been deformed (X1). In contrast to the pyroelectric effect, however, the curve profile is continuous and may be very much more rapid. The amplitude or voltage change is typically less by a factor of 10 to 100 for the pyroelectric effect than for the piezoelectric effect, although this is not apparent from a comparison of FIG. 6 with FIG. 7 since the curves have been correspondingly amplified beforehand.

The capacitive effect may on the other hand not induce a sign change in the measurement curve, and an excursion may be temporally faster than an excursion because of the piezoelectric effect, as may be seen in FIG. 8. The two measurement curves in FIG. 8 were acquired with a sensor 1 in which the second electrode 3b was connected to ground in one case and not in the other case. Since no voltage change occurs in the measurement curve without a ground connection of the second electrode 3b, it may be established that the voltage change is attributable only to the capacitive effect, and no piezoelectric effect, which would lead to a voltage change independently of the ground connection of the second electrode 3b, occurs. By analysis of the measurement curve in respect of these different characteristics, the evaluation electronics 7 may carry out an allocation to the physical effects.

Figure 9:
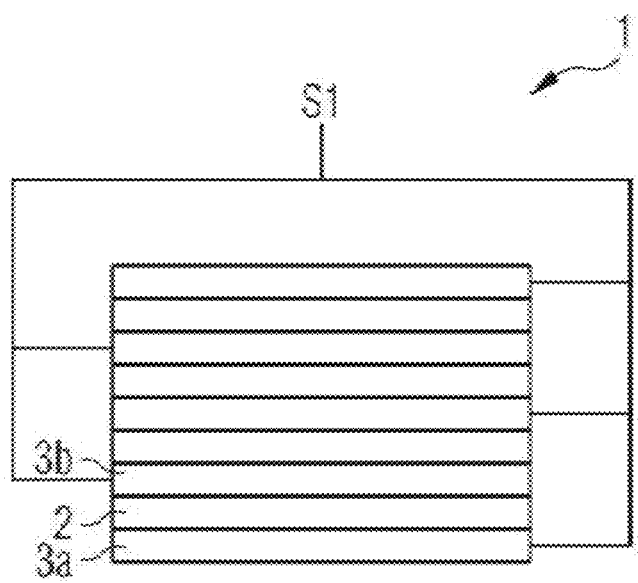
FIG. 9 shows a schematic cross-sectional view of a multilayer-configured sensor, the electrical signal being amplified.

If, as shown in FIG. 9, the sensor 1 is in the form of a multilayer component, all the first electrodes 3a may be electrically contacted by the same first electrical contact element and all the second electrodes may be electrically contacted by the same second electrical contact element. The individual first and second electrodes are therefore connected in parallel. In this way, an amplified electrical signal S1 may be employed for the evaluation in the scope of a signal addition from the electrical signals S of the individual functional layers.

Figure 10:
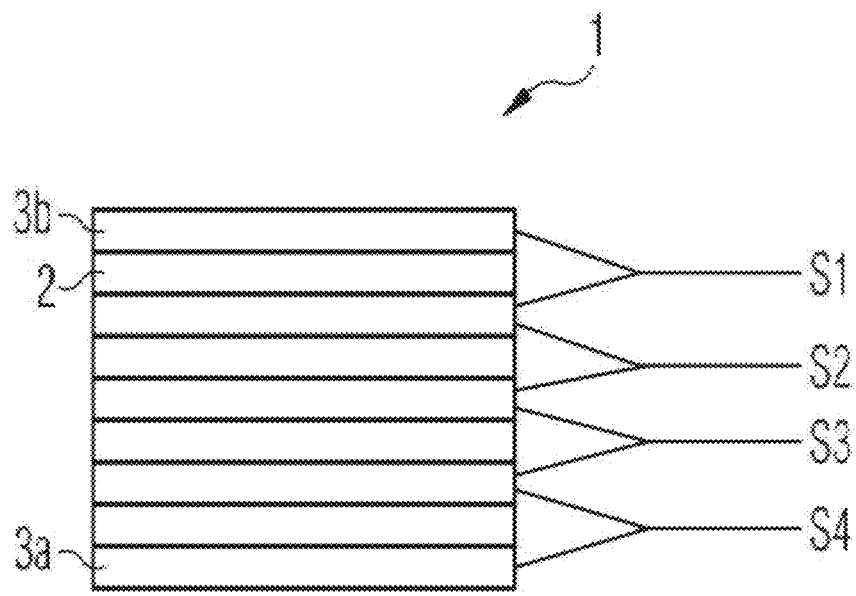
FIG. 10 shows a schematic cross-sectional view of a multilayer-configured sensor, a plurality of individual electrical signals being read out.

In the alternative embodiment as shown in FIG. 10, individual functional layers are contacted separately. In this case, the first electrodes are electrically contacted by respectively separate first contact elements and the second electrodes are electrically contacted by respectively separate second contact elements. In this way, a separate electrical signal (S1, S2, S3, S4) may be evaluated for the respective functional layer, it being additionally possible to tap different types of sensor signals, and to distinguish them according to the physical effects, for the individual functional layers.

Figure ii shows a schematic cross-sectional view of a plate-shaped enclosed exemplary embodiment in which the first electrode 3a is arranged inside the sensor 1, the ferroelectric layer 2 enclosing the first electrode 3a and the second electrode in turn enclosing the ferroelectric layer 2. Such a sensor 1 may be constructed layer-by-layer with the aid of suitable production processes for flat layers, for instance screen printing. It may in this case be advantageous to print over inner layers with a larger-area layer in order to achieve enclosure. During the production of the enclosure, it may however also be expedient first to apply a layer arranged above on one side of the inner layer, then to turn the component over and apply the same type of layer on the other side. Before turning over, the applied layer is dried.

Figure 11:
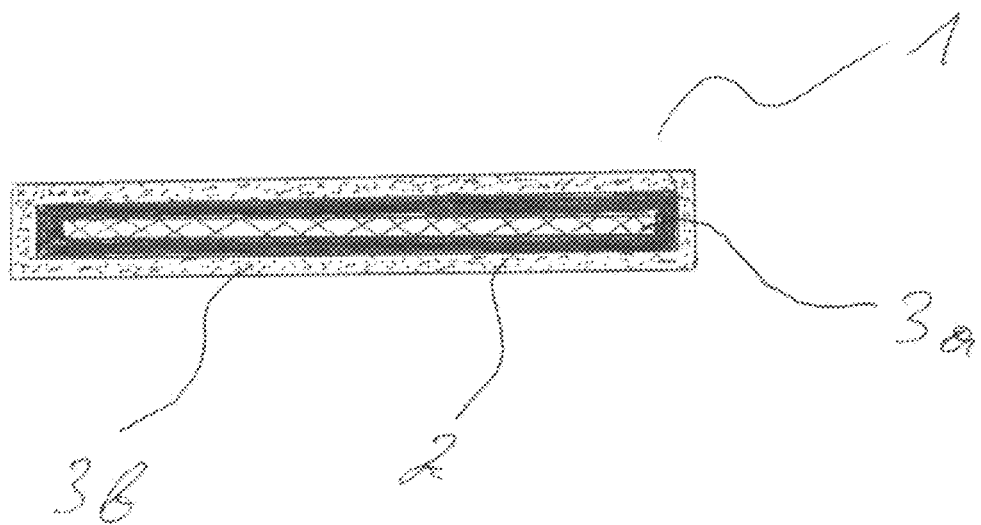
FIG. 11 shows a schematic cross-sectional view of a plate-shaped enclosed exemplary embodiment, the first electrode being arranged inside the sensor.
Figure 12:
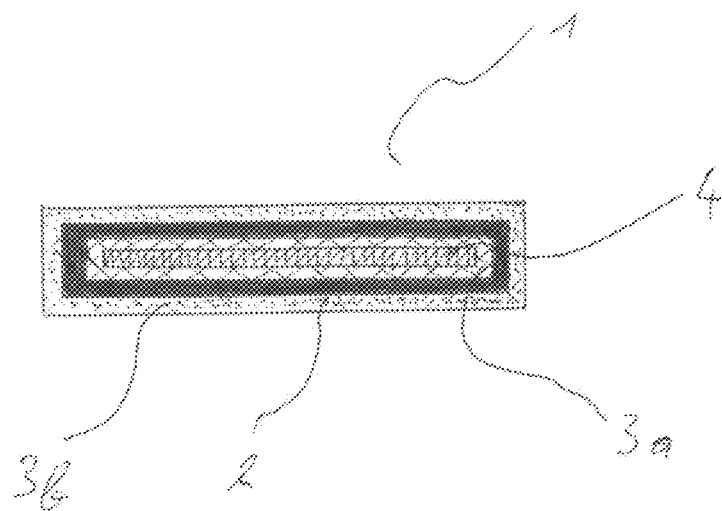
FIG. 12 shows a schematic cross-sectional view of a plate-shaped enclosed exemplary embodiment, a carrier material being arranged inside the sensor.

FIG. 12 shows a schematic cross-sectional view, similar to FIG. 11, of a plate-shaped enclosed exemplary embodiment of a sensor 1, a carrier material 4 in this case being arranged inside the sensor. This exemplary embodiment may also, as in FIG. 11, be produced by a production process for flat layers, either with the layers being applied successively or by turning the component over for each enclosing layer.

The carrier material 4 may be either nonresilient or resilient. By a nonresilient carrier material 4, for instance a substrate, the stability of the sensor 1 is increased. For selected applications, arrangement on a carrier material 4 consisting of for example glass, concrete or steel may be preferred. Resilient materials which are envisioned as carrier material 4 may inter alia be rubber, a plastic or a textile, for example a cotton yarn.

Figure 13:
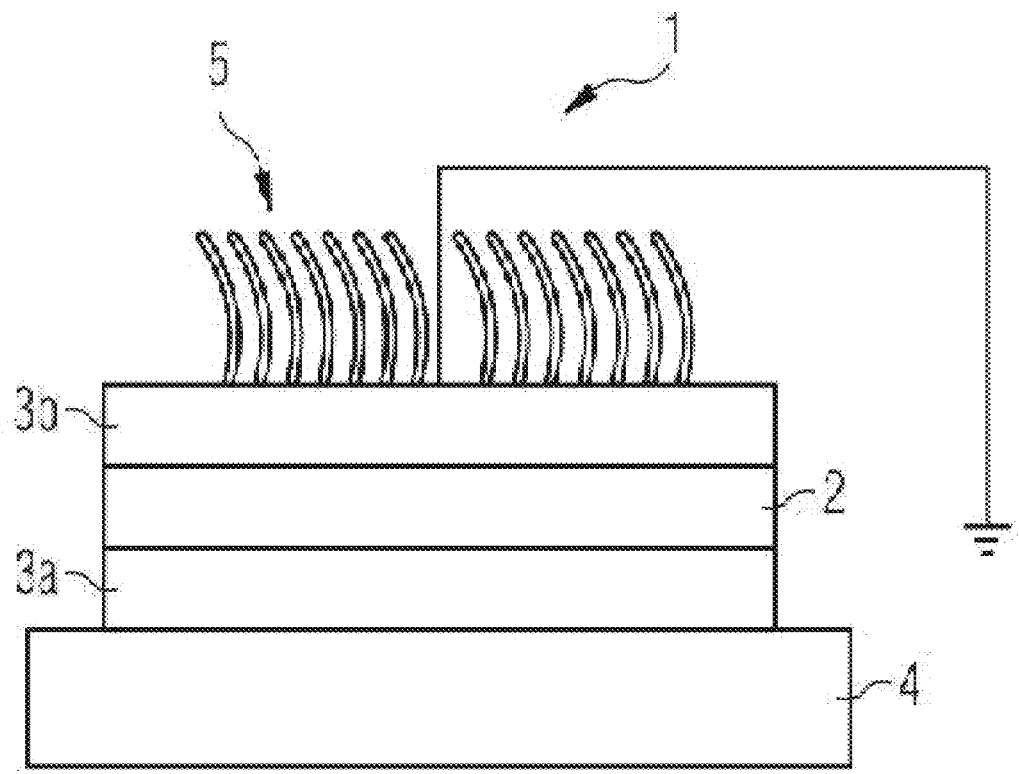
FIG. 13 shows a schematic cross-sectional view of a further exemplary embodiment, amplifier elements being arranged on the second electrode.

FIG. 13 shows a schematic cross-sectional view of a sensor 1 similar to FIG. 1, the sensor 1 being arranged on a carrier material 4 and comprising mechanical amplifier elements 5 on the second electrode 3b. The mechanical amplifier elements 5, which are represented in FIG. 13 as hair- or bristle-shaped projections, can mechanically transmit a touch to the second electrode 3b. Since the ferroelectric layer 2 adheres on the second electrode 3b, this touch is also forwarded to the ferroelectric layer 2 and thus deforms the ferroelectric layer 2. This increases the detection range which can be covered with the piezoelectric effect. The mechanical amplifier elements 5 are made either of a composite material or of plastics such as PET, thermoset or PTFE.

Figure 14:
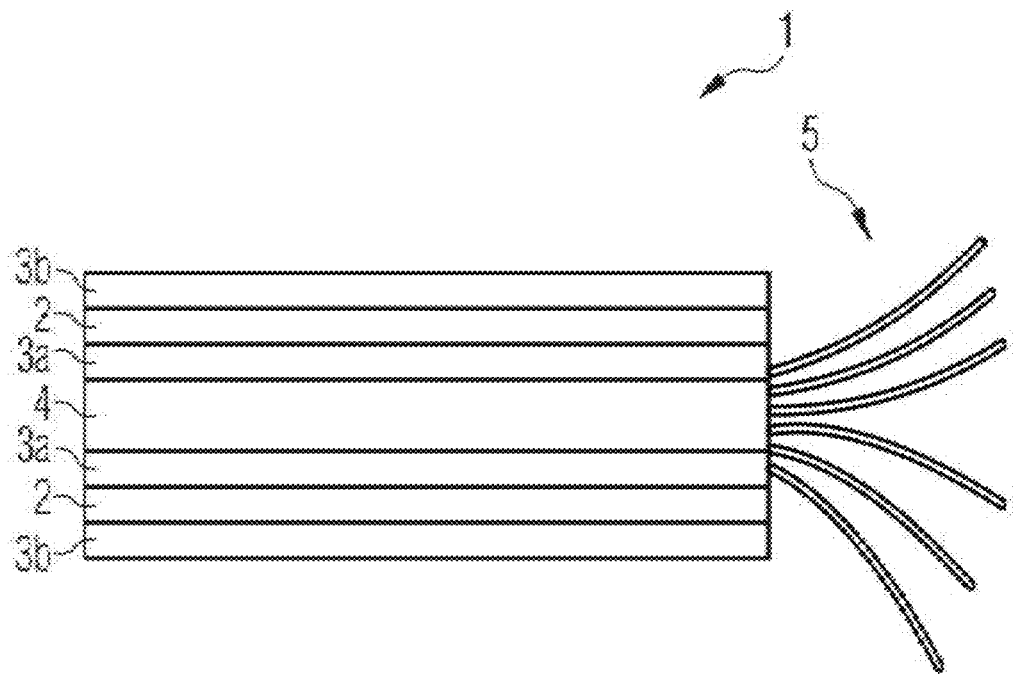
FIG. 14 shows a schematic cross-sectional view of a cylindrical exemplary embodiment, amplifier elements being arranged on the carrier material and the first electrode.
Figure 15:
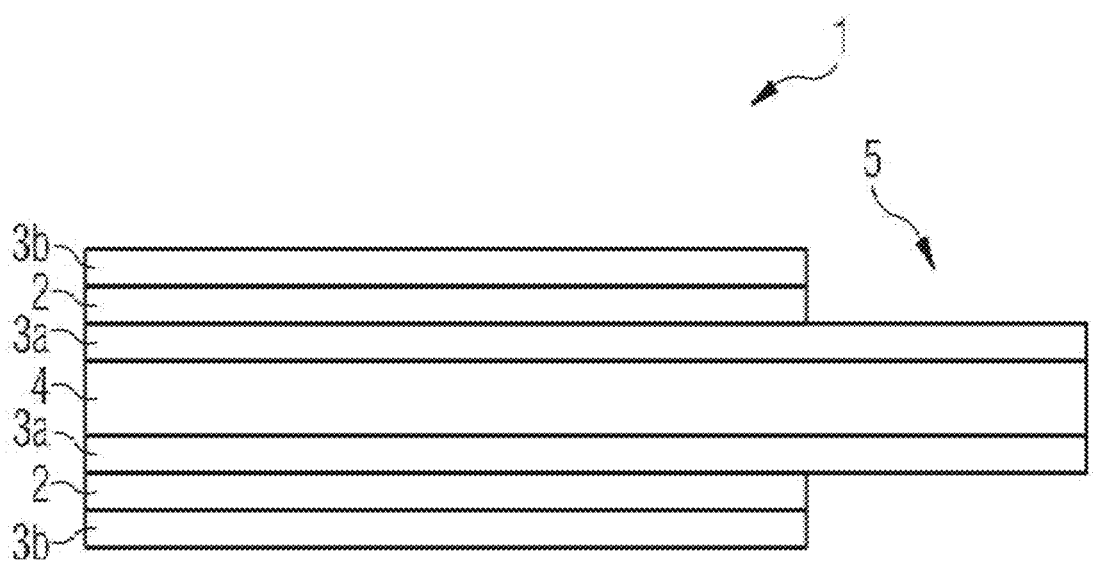
FIG. 15 shows a schematic cross-sectional view of a fourth cylindrical exemplary embodiment, the lengthened carrier material with the first electrode being used as an amplifier element.

Mechanical amplifier elements 5 may likewise be applied or formed on cylindrical sensors 1 and sensors 1 which are not arranged on a carrier material 4. The amplifier elements 5 are preferably applied in the axial direction as an extension of the first electrode 3a and/or the carrier material 4, as shown in FIG. 14. The amplifier element 5 is in this case preferably not additionally applied but produced by the first electrode 3a and the carrier material 4, no further ferroelectric layers 2 and no further second electrodes 3b being applied on the first electrode 3a and the carrier material 4 in a region which is used as an amplifier element 5. A representation of a cross section of a sensor configured in such a way is represented in FIG. 15. For additional signal amplification, such cylindrical sensors 1 provided with amplifier elements 5 may be combined as bundles of a plurality of individual sensors 1.

As an alternative, the amplifier element 5 may also be formed only from the carrier material 4. In a cylindrical exemplary embodiment in which the carrier material 4 is arranged on the inside, the first electrodes 3a are then omitted in the region of the amplifier element 5. If the sensor 1 is arranged on a carrier material 4 which has a greater extent than the sensor 1 itself, the protruding part of the carrier material 4 also acts as an amplifier element 5. In embodiments in which the first electrode 3a instead of a carrier material 4 is arranged on the inside, the amplifier element 5 may also be formed only from the first electrode 3a. The first electrode 3a then protrudes from the sensor 1, a ferroelectric layer 2 and a second electrode 3b being omitted.

Figure 16:
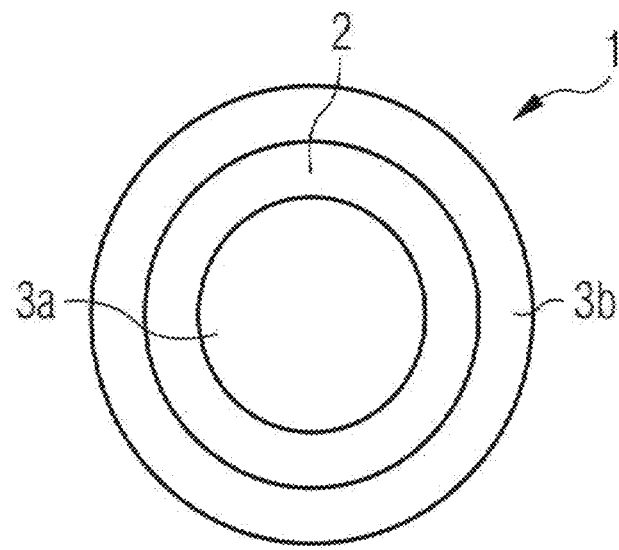
FIG. 16 shows a schematic cross-sectional view of a cylindrical exemplary embodiment.

FIG. 16 shows a schematic cross-sectional view of a cylindrically configured sensor 1. Arranged on the inside, there is the first electrode 3a, which is enclosed by a ferroelectric layer 2. The ferroelectric layer 2 is in turn enclosed by the second electrode 3b. The second electrode 3b is grounded, this not being represented in FIG. 16.

The first electrode 3a may be a commercially available wire. The first electrode 3a is preferably kept very thin with a diameter of about 150 µm to 250 µm in order to reduce the thermal mass of the sensor 1. The ferroelectric layer 2 is configured to be thin with a thickness of less than 5 µm for the same reason. The second, in this embodiment outermost, electrode needs to be balanced in the selection of the thickness of the layer between the sensitivity of the sensor 1 and the protection of the ferroelectric layer 2. In practice, a thickness of about 10 µm has been found as an advantageous compromise.

The cylindrical shape of the sensor 1 is particularly advantageous for applications in which the sensor 1 is intended to be inserted into a narrow opening. Furthermore, a cylindrical geometry of the sensor 1 is helpful for increasing the sensitivity in relation to deformations. In addition, the cylindrical embodiment makes it possible to produce the sensor 1 in an endless process, in a similar way to wire or cable manufacturing. This simplifies production and reduces the production costs.

Figure 17:
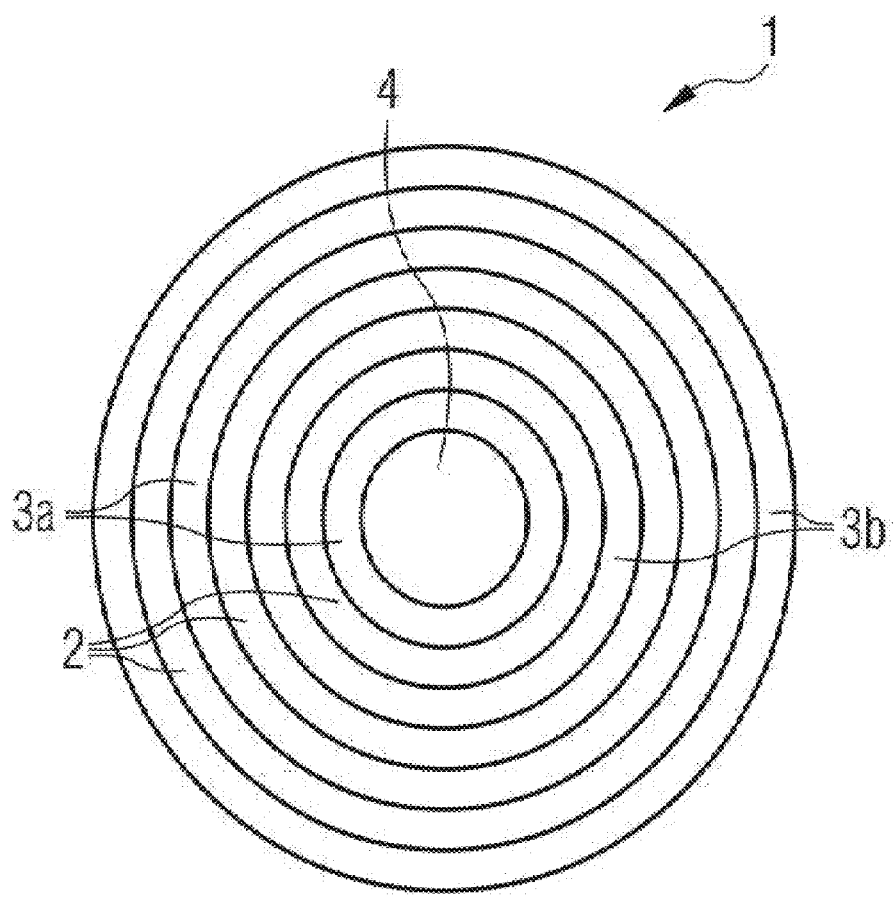
FIG. 17 shows a schematic cross-sectional view of a multilayer cylindrical exemplary embodiment.

FIG. 17 shows a schematic cross-sectional view of a cylindrically configured sensor 1 similar to FIG. 14. A carrier material 4 is arranged on the inside. Two first and second electrodes 3a, 3b respectively alternatingly enclose the carrier material 4, a ferroelectric layer 2 respectively being arranged between the first and second electrodes 3a, 3b. The layers inside the sensor 1 are also thinner than 5 µm in this exemplary embodiment. The second electrode 3b, which forms the outermost layer, is preferably 10 µm thick. By the use of a plurality of ferroelectric layers 2, the accuracy of the sensor 1 is increased in comparison with an exemplary embodiment with one ferroelectric layer 2.

The carrier material 4 may for example be a textile fiber, glass fiber or fiber Bragg grating. If a textile fiber is used as the carrier material 4, it may be woven into clothing, coverings, carpets and other textile products. Textile fibers made of plastic, for instance polyester, are outstandingly suitable as carrier material 4. Natural fibers, for example of cotton, may likewise be used. A glass fiber as a carrier material 4 may be used for displaying the system state, for instance whether a direct touch or an approach is taking place, by light of a particular color being transmitted through the glass fiber. The use of fiber Bragg gratings is also possible as carrier material 4. This may expand the sensing arrangement, for example by using it as a force sensor. In this case, however, it should be noted that further optical evaluation equipment is required for this.

Figure 18:
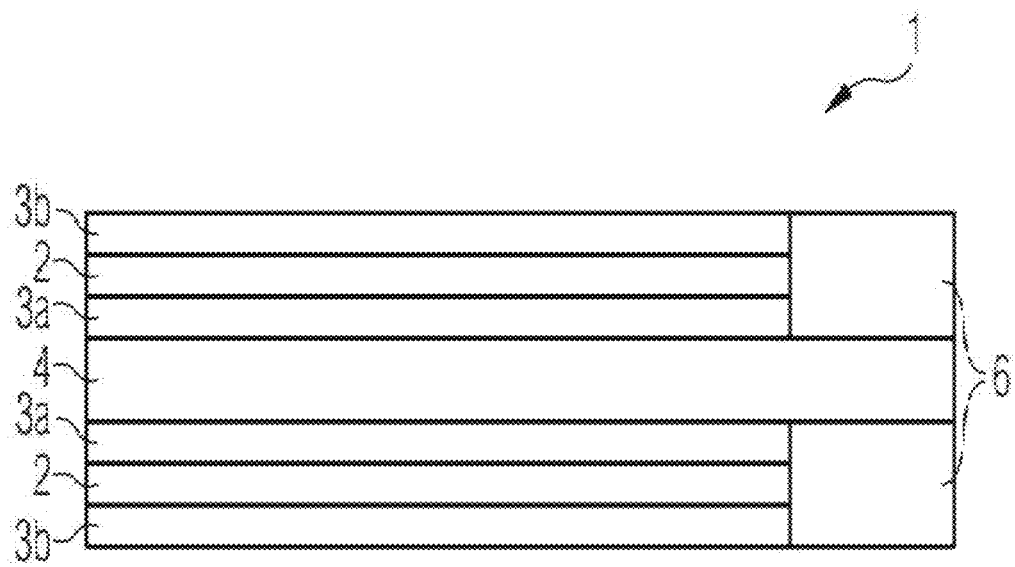
FIG. 18 shows a schematic cross-sectional view of a cylindrical exemplary embodiment, an optically reactive layer being arranged on the carrier material.

FIG. 18 shows a longitudinal cross-sectional view of a cylindrically configured sensor 1. Arranged on the inside, there is a glass fiber, which is enclosed by a first and second electrode 3a, 3b, a ferroelectric layer 2 being arranged between the first and second electrodes 3a, 3b. On a part of the lateral surface of the glass fiber, an optically reactive sensor layer 6 has been applied instead of the first and second electrode 3a, 3b and the ferroelectric layer 2. This optically reactive layer 6 may for example react to the pH or $O_2$ content in the environment by a color change or fluorescence change. This color change may be measured with the aid of evanescent light waves which emerge from the glass fiber. In this way, the sensing arrangement and the potential application field for the sensor 1 may be expanded.

Figure 19:
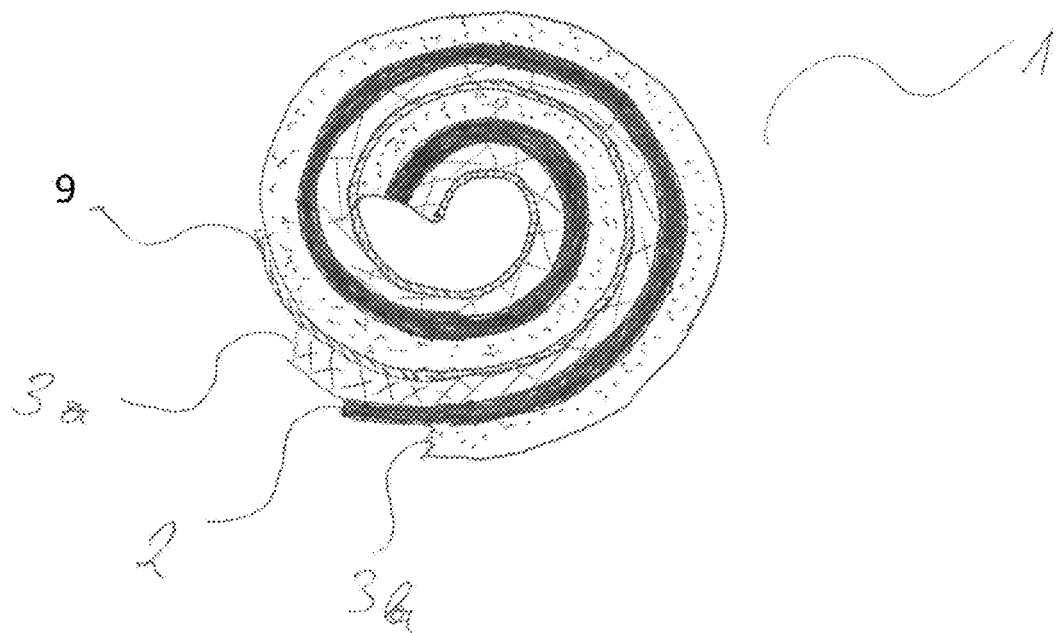
FIG. 19 shows a schematic cross-sectional view of an exemplary embodiment with an insulation layer, the sensor being coiled.

FIG. 19 shows a schematic cross-sectional view of an exemplary embodiment with an insulation layer 9, the sensor 1 being coiled in such a way that the insulation layer 9 is located on the inside. The insulation layer is an electrically insulating flexible layer, which may consist of a flexible thin carrier material 4. The insulation layer 9 prevents the first and second electrodes 3a/3b from short-circuiting when coiled.

A coiled embodiment makes it possible to produce a cylindrical sensor 1 even with flat production processes. By the sensor 1 being coiled repeatedly, a multiple-layer component may be produced, although it should be noted that the radially successive electrodes are not electrically separated from one another as in an enclosed sensor 1, but are connected to one another. The coiled sensor 1 therefore has an increased capacitance in comparison with an enclosed sensor 1, and the capacitive effect is more pronounced.

Figure 20:
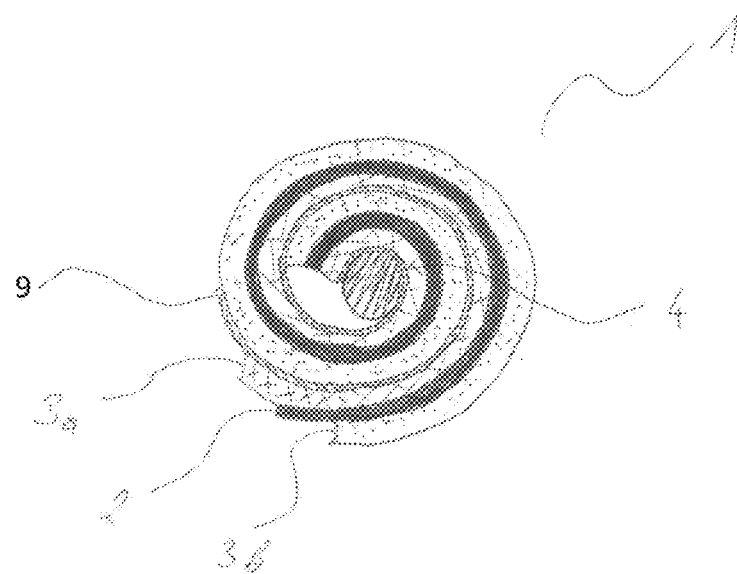
FIG. 20 shows a schematic cross-sectional view of an exemplary embodiment with an insulation layer, the sensor being coiled around a carrier material.

In a similar way to FIG. 19, FIG. 20 shows a schematic cross-sectional view of an exemplary embodiment with an insulation layer 9, the sensor 1 being coiled around a carrier material 4. The mechanical properties of the coiled sensor 1 can be influenced with the aid of the carrier material 4.

A combination of the various embodiments is likewise possible. For example, enclosed sensors 1 may be used as carrier material 4, a further sensor being coiled around the enclosed sensor 1. The pronounced capacitive effect of the coiled sensor 1 may therefore be combined with the advantages of an enclosed sensor 1.

All the exemplary embodiments may furthermore be provided with a protective layer, for instance of plastic, in order to protect the sensor 1 from a harmful environment.

Figure 21:
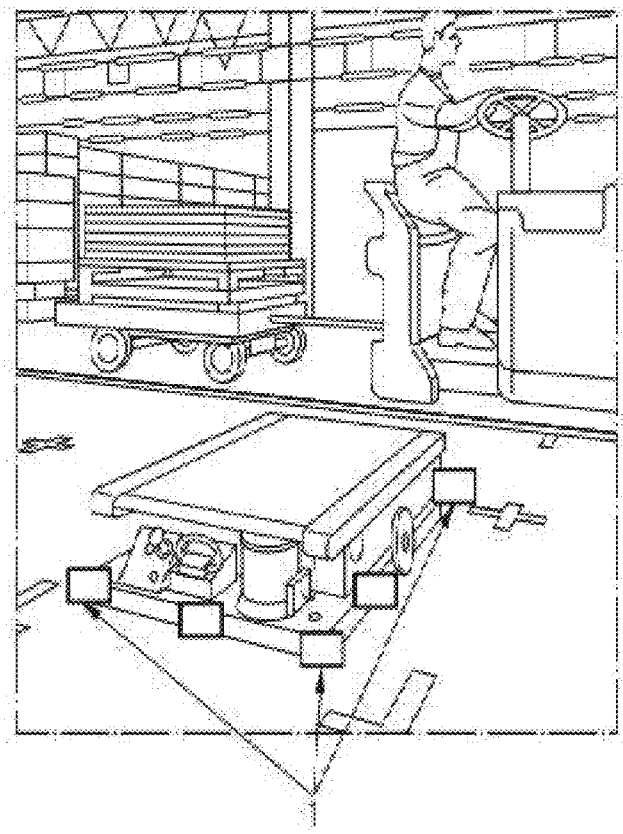
FIG. 21 shows a robot with possible sensor positions.

FIG. 21 shows an autonomous transport robot by way of an example of robots in general. The boxes in the lower region of the robot show advantageous positions for fitting a sensor 1. If the robot approaches a human, for example, at a distance of a few meters a voltage change at the electrodes 3a, 3b of the sensor 1 is established on the basis of the pyroelectric effect, and the robot may for example consequently reduce its speed. If the robot continues to approach the human, from a distance of about one meter a voltage change which occurs because of the capacitive effect is established. At this position, because of the proximity to the human, the robot may change its movement direction. If the robot nevertheless then collides with the human, the sensor 1 is deformed and a voltage change as a result of the piezoelectric effect is detected. In order to cause no damage, the robot could then remain stationary or reverse. If it remains stationary and the deformation of the ferroelectric layer therefore does not change, the voltage change because of the piezoelectric effect disappears. The touching may nevertheless continue to be detected by the capacitive effect.

Figure 22:
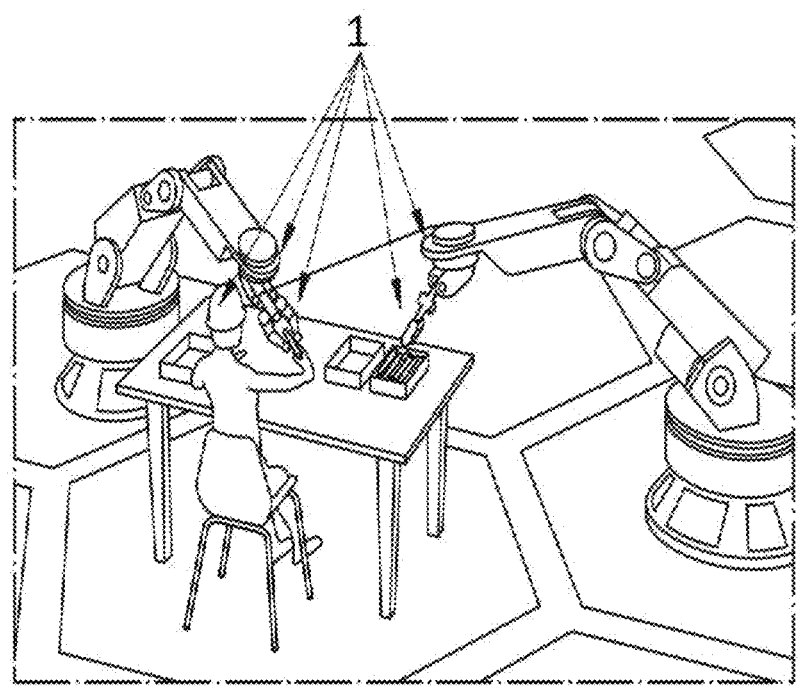
FIG. 22 shows a collaborative system with possible sensor positions.
Figure 23:
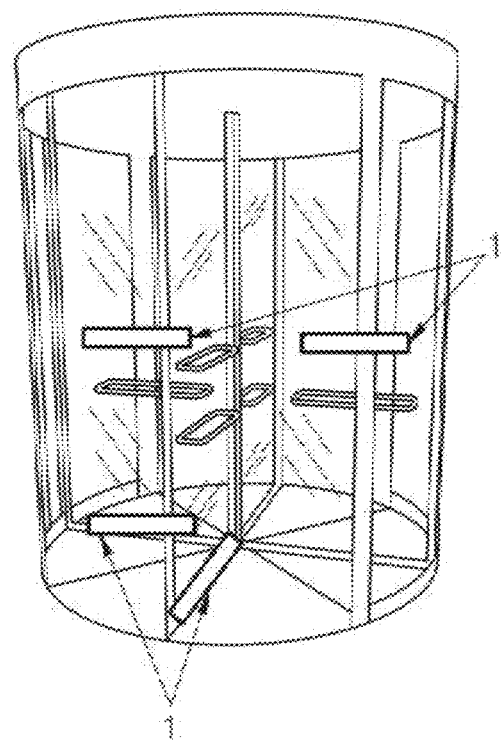
FIG. 23 shows an automatic revolving door with possible sensor positions.
Figure 24:
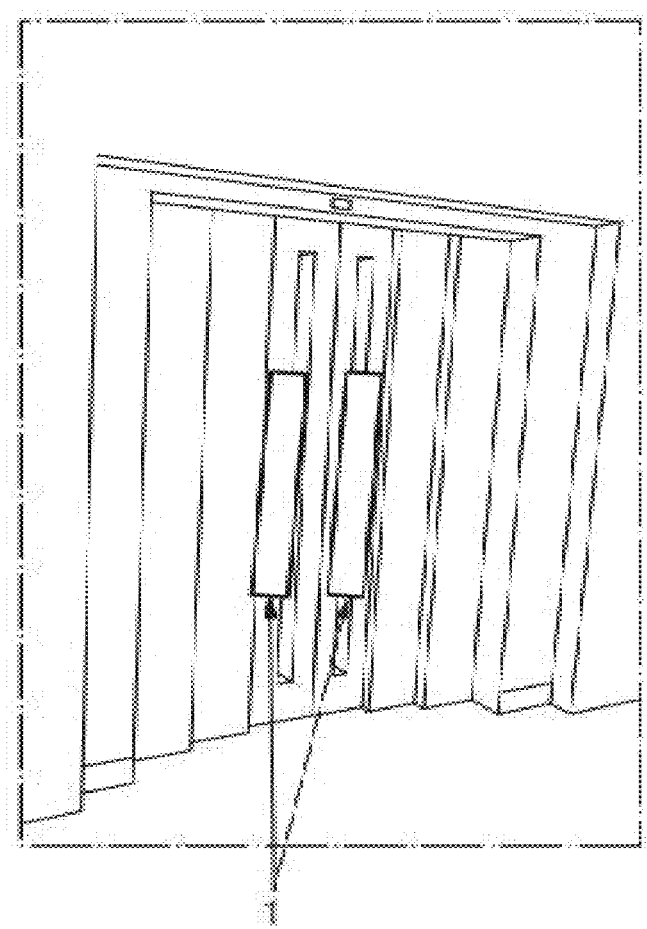
FIG. 24 shows an automatic elevator door with possible sensor positions.

FIG. 22 shows a collaborative system in which sensors 1 are integrated. In particular the ends of the robot arms, which may come particularly close to a collaborating human, are suitable for positioning the sensors 1. FIGS. 23 and 24 show the advantageous positions for the sensors 1 on automatic doors. An automatic revolving door could for instance reduce its rotational speed in the event of an approach, and increase the rotational speed again in the event of touching the sensor 1. An automatic elevator door as shown in FIG. 24 could for example already make the doors open if a person approaches. As a result, safety may be increased in comparison with the photoelectric barriers often used, since the sensors can already establish an approach of a person to the door rather than not reacting until this person is already standing in the door.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. A sensor comprising:
a first electrode;
a ferroelectric layer;
a second electrode, wherein the second electrode is connected to ground and the ferroelectric layer is arranged between the first and second electrodes; and
a carrier material and at least one mechanical amplifier element,
wherein the at least one mechanical amplifier element is arranged on at least one of the first electrode, the second electrode or the carrier material, and
wherein the at least one mechanical amplifier element is an extension of the first electrode and/or the carrier material in an axial direction.

2. The sensor as claimed in claim 1, wherein the ferroelectric layer comprises a polymer, a ceramic or a polymer-ceramic matrix.

3. The sensor as claimed in claim 1, wherein the first electrode and/or the second electrode comprise(s) a transparent and a thermally as well as electrically conductive material.

4. The sensor as claimed in claim 1, wherein the first electrode and/or the second electrode comprise(s) one or more metals, the one or more metals comprising Al, Cr, Ni, Ag, Cu, Fe or a mixture thereof or an alloy of these elements.

5. The sensor as claimed in claim 1, wherein the first electrode and/or the second electrode comprise(s) a conductive layer which is transparent in an UV-Vis range and/or in an IR range.

6. The sensor as claimed in claim 1, wherein the first electrode and/or the second electrode comprise(s) an indium titan oxide (ITO), a poly(3,4-ethylenedioxythiophene) polystyrene sulfonate (PEDOT:PSS), silver, nanowires, graphite, carbon nanotubes or graphene.

7. The sensor as claimed in claim 1, further comprising additional first electrodes, additional second electrodes and additional ferroelectric layers, and wherein the ferroelectric layers are arranged between the first and second electrodes.

8. The sensor as claimed in claim 7, wherein all the first electrodes are connected in parallel with one another and all the second electrodes are connected in parallel with one another, and wherein the sensor is configured to provide an electrical signal between the first and second electrodes.

9. The sensor as claimed in claim 7, wherein individual ferroelectric layers are contacted separately, and wherein the sensor is configured to provide an electrical signal for each of the ferroelectric layers respectively between one of the first electrodes and one of the second electrodes.

10. The sensor as claimed in claim 1, wherein the first electrode is arranged inside the sensor, wherein the ferroelectric layer encloses the first electrode, and wherein the second electrode encloses the ferroelectric layer.

11. The sensor as claimed in claim 1,
wherein the sensor comprises an insulation layer on which the first electrode or the second electrode is arranged, and
wherein the sensor is coiled such that the insulation layer lies on an inner side.

12. The sensor as claimed in claim 1, wherein the first electrode or the second electrode is arranged on the carrier material.

13. The sensor as claimed in claim 1,
wherein the sensor comprises an insulation layer on which the first electrode or the second electrode is arranged, and
wherein the sensor is coiled such that the insulation layer is arranged on the carrier material.

14. The sensor as claimed in claim 1, wherein the carrier material is arranged inside the sensor, and wherein the first electrode encloses the carrier material, the ferroelectric layer encloses the first electrode and the second electrode encloses the ferroelectric layer.

15. The sensor as claimed in claim 14,
wherein additional first electrodes, additional second electrodes and additional ferroelectric layers enclose the second electrode,
wherein the first and second electrodes are arranged radially alternating, and
wherein each of the ferroelectric layers is respectively arranged between one of the first electrodes and one of the second electrodes.

16. The sensor as claimed in claim 1, wherein the carrier material is a glass fiber.

17. The sensor as claimed in claim 16, further comprising an optically reactive sensor layer arranged on a part of a lateral surface of the glass fiber.

18. The sensor as claimed in claim 1, wherein the sensor is a cylindrical sensor or wherein the sensor has a shape of a plate.

19. The sensor as claimed in claim 1, wherein the at least one mechanical amplifier element is formed from the first electrode and/or the second electrode.

20. The sensor as claimed in claim 1, wherein the at least one mechanical amplifier element is formed from the carrier material.

21. The sensor as claimed in claim 1, wherein the at least one mechanical amplifier element is formed from the first electrode and the carrier material.

22. The sensor as claimed in claim 1, wherein the ferroelectric layer and/or the first electrode and/or the second electrode is/are thinner than 50 µm.

23. The sensor as claimed in claim 1, wherein the ferroelectric layer comprises a piezoelectric and/or pyroelectric material.

24. An arrangement comprising:
at least one set of evaluation electronics; and
at least one sensor as claimed in claim 1,
wherein the evaluation electronics are configured to:
measure an electrical signal generated by the sensor, and
identify a piezoelectric effect, a pyroelectric effect and a capacitive effect by changes of the electrical signal.

25. The arrangement as claimed in claim 24, wherein the evaluation electronics are configured to identify, with aid of the measured changes of the electrical signal, whether an object is approaching the sensor or whether an object is touching the sensor.

26. The arrangement as claimed in claim 24, wherein the measured changes of the electrical signal comprise a change in a signal/time profile and/or an amplitude and/or a timescale and/or temporal dynamics and/or a polarity.

27. The arrangement as claimed in claim 24, wherein the electrical signal comprises a voltage and/or a charge and/or a capacitance and/or a polarity.

28. The arrangement as claimed in claim 24, further comprising:
a plurality of sensors as claimed in claim 1,
wherein the sensors are arranged in a matrix.

29. A robot comprising:
the sensor as claimed in claim 1.

30. A collaborative system comprising:
the sensor as claimed in claim 1.

31. An automatic door comprising:
the sensor as claimed in claim 1.

32. A method for producing the sensor as claimed in claim 1, the method comprising:
applying the ferroelectric layer on the first electrode by a thin-film method, by a combination of a sol-gel method with spin coating, or by screen printing.

33. The sensor as claimed in claim 1, wherein the carrier material is a textile fiber.

* * * * *